US012609977B2

(12) United States Patent
Schleier-Smith et al.

(10) Patent No.: US 12,609,977 B2
(45) Date of Patent: *Apr. 21, 2026

(54) DETERMINING AND MANAGING SOCIAL INTERACTION OPTIONS IN SOCIAL NETWORKING ENVIRONMENTS

(71) Applicant: Ifwe, Inc., San Francisco, CA (US)

(72) Inventors: Johann Schleier-Smith, San Francisco, CA (US); Greg Tseng, Los Altos, CA (US); Jared Kim, San Francisco, CA (US)

(73) Assignee: Ifwe, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,651

(22) Filed: May 12, 2023

(65) Prior Publication Data

US 2023/0283649 A1 Sep. 7, 2023

Related U.S. Application Data

(63) Continuation of application No. 17/505,118, filed on Oct. 19, 2021, now Pat. No. 11,689,590, which is a continuation of application No. 13/833,258, filed on Mar. 15, 2013, now Pat. No. 11,190,558.

(60) Provisional application No. 61/648,355, filed on May 17, 2012.

(51) Int. Cl.
| | |
|---|---|
| *G06F 3/048* | (2013.01) |
| *G06Q 10/10* | (2023.01) |
| *H04L 51/52* | (2022.01) |
| *H04L 65/403* | (2022.01) |
| *G06Q 50/00* | (2012.01) |

(52) U.S. Cl.
CPC ........... *H04L 65/403* (2013.01); *G06Q 10/10* (2013.01); *H04L 51/52* (2022.05); *G06F 3/048* (2013.01); *G06Q 50/01* (2013.01)

(58) Field of Classification Search
CPC ....... H04L 65/403; H04L 51/52; G06Q 10/10; G06Q 50/01; G06F 3/048
See application file for complete search history.

(56) References Cited

U.S. PATENT DOCUMENTS

| | | | | |
|---|---|---|---|---|
| 7,739,139 B2 * | 6/2010 | Robertson | ............. | H04L 63/102 |
| | | | | 705/7.12 |
| 7,828,661 B1 * | 11/2010 | Fish | ...................... | A63F 13/795 |
| | | | | 709/204 |
| 8,151,358 B1 * | 4/2012 | Herold | ................ | G06F 3/04847 |
| | | | | 715/851 |

(Continued)

FOREIGN PATENT DOCUMENTS

| | | |
|---|---|---|
| JP | 2008146246 A | 6/2008 |
| JP | 2009288995 A | 12/2009 |

*Primary Examiner* — Xuyang Xia

(74) *Attorney, Agent, or Firm* — Perkins Coie LLP; Colin Fowler; Benjamin Desch

(57) ABSTRACT

Embodiments of the present disclosure include systems and methods for determining and managing social interaction options for social connections such as, for example, friendships in a social networking environment. In one embodiment, users of a social network are provided with more granularity in controlling the social interactions associated with individual social connections. The social connections can be a connection between two of more users of a social networking environment.

20 Claims, 11 Drawing Sheets

(56)             References Cited

U.S. PATENT DOCUMENTS

| | | | | |
|---|---|---|---|---|
| 8,246,463 | B2 * | 8/2012 | Kuwahara | A63F 13/12 |
| | | | | 463/40 |
| 8,689,098 | B2 * | 4/2014 | Halliday | G06F 16/58 |
| | | | | 715/234 |
| 2004/0255032 | A1 | 12/2004 | Danieli | |
| 2005/0114672 | A1 | 5/2005 | Duncan et al. | |
| 2005/0181878 | A1 * | 8/2005 | Danieli | G07F 17/3276 |
| | | | | 463/42 |
| 2008/0229215 | A1 | 9/2008 | Baron et al. | |
| 2009/0013413 | A1 | 1/2009 | Vera et al. | |
| 2009/0216806 | A1 | 8/2009 | Feuerstein et al. | |
| 2010/0174709 | A1 | 7/2010 | Hansen et al. | |
| 2011/0153759 | A1 | 6/2011 | Rathod | |
| 2011/0208822 | A1 | 8/2011 | Rathod | |
| 2011/0250971 | A1 * | 10/2011 | van Os | A63F 13/795 |
| | | | | 463/43 |
| 2011/0258316 | A1 * | 10/2011 | Rizk | G06Q 30/02 |
| | | | | 709/225 |
| 2012/0178536 | A1 * | 7/2012 | Oh | A63F 13/87 |
| | | | | 463/42 |
| 2013/0019319 | A1 | 1/2013 | Pearlman et al. | |
| 2013/0132476 | A1 | 5/2013 | Shaffer et al. | |
| 2013/0166726 | A1 * | 6/2013 | Boldyrev | G06Q 10/10 |
| | | | | 709/224 |
| 2014/0019882 | A1 * | 1/2014 | Chew | H04L 51/52 |
| | | | | 715/753 |
| 2014/0136617 | A1 | 5/2014 | Singer et al. | |

* cited by examiner

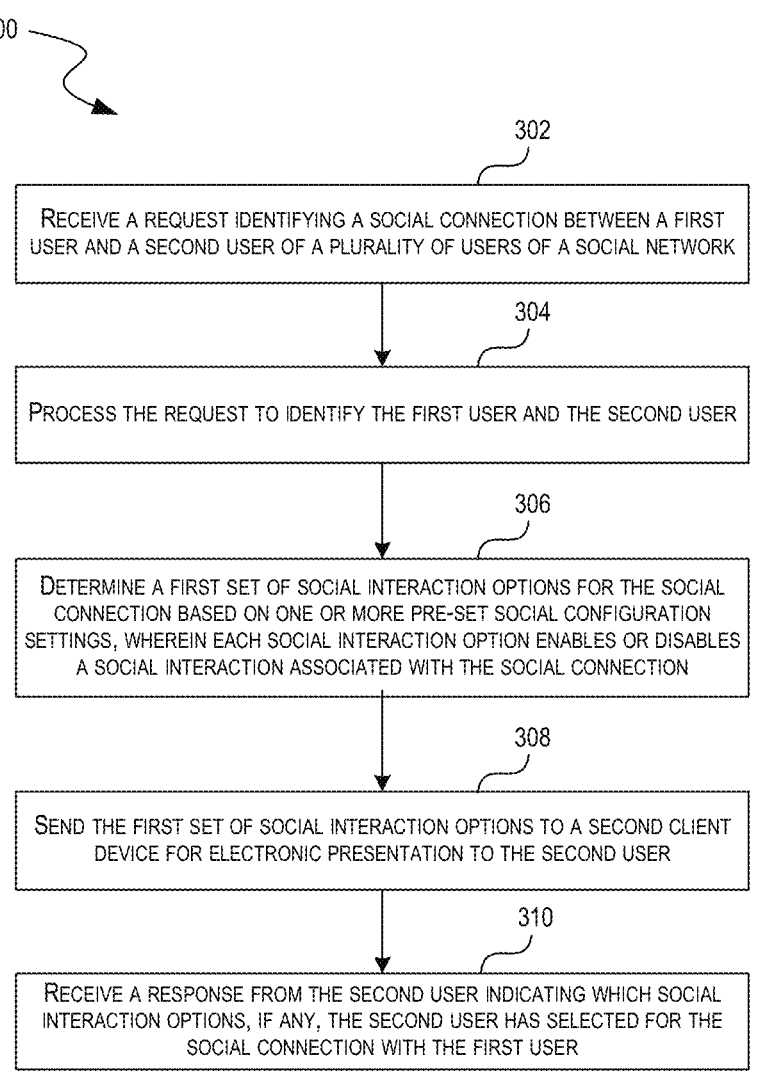

300

302

RECEIVE A REQUEST IDENTIFYING A SOCIAL CONNECTION BETWEEN A FIRST USER AND A SECOND USER OF A PLURALITY OF USERS OF A SOCIAL NETWORK

304

PROCESS THE REQUEST TO IDENTIFY THE FIRST USER AND THE SECOND USER

306

DETERMINE A FIRST SET OF SOCIAL INTERACTION OPTIONS FOR THE SOCIAL CONNECTION BASED ON ONE OR MORE PRE-SET SOCIAL CONFIGURATION SETTINGS, WHEREIN EACH SOCIAL INTERACTION OPTION ENABLES OR DISABLES A SOCIAL INTERACTION ASSOCIATED WITH THE SOCIAL CONNECTION

308

SEND THE FIRST SET OF SOCIAL INTERACTION OPTIONS TO A SECOND CLIENT DEVICE FOR ELECTRONIC PRESENTATION TO THE SECOND USER

310

RECEIVE A RESPONSE FROM THE SECOND USER INDICATING WHICH SOCIAL INTERACTION OPTIONS, IF ANY, THE SECOND USER HAS SELECTED FOR THE SOCIAL CONNECTION WITH THE FIRST USER

DETERMINING AND MANAGING SOCIAL INTERACTION OPTIONS IN SOCIAL NETWORKING ENVIRONMENTS

CROSS-REFERENCE TO RELATED APPLICATIONS

This application is a continuation of U.S. patent application Ser. No. 17/505,118, filed on Oct. 19, 2021, which is a continuation of U.S. patent application Ser. No. 13/833,258, filed Mar. 15, 2013, now U.S. Pat. No. 11,190,558, which claims the benefit of priority to U.S. Provisional Patent Application No. 61/648,355, filed on May 17, 2012, which are incorporated by reference herein in their entireties.

BACKGROUND

Social networks in online environments are increasingly relied upon by individuals to engage and participate in various types of social activities and behaviors. For example, individuals use online social networks to facilitate friendly, casual, romantic, business relationships and to maintain connections and initiate dialogues with others. With the prevalence of high speed network connections to the Internet and the availability of mobile devices with wireless capabilities, the online environment has become one of the dominating mechanisms through which people communicate and connect with one another.

For example, online social networks are increasingly used by many individuals of all ages and demographic groups to stay in touch and to stay connected with existing friends, family members, and business colleagues. Further, online social networks are also increasingly being used to build connections, acquaintances, or potential business partners. Via these online social networks, users can join common interest groups, meet others with similar interests, and/or have access to updated contact information associated with contacts, friends, and/or acquaintances. Unfortunately, in today's social networks individuals must share information with, and allow communications with, everyone in their social network despite the fact that these social relationships are not created equal.

BRIEF DESCRIPTION OF THE DRAWINGS

FIG. 3 depicts a flow diagram illustrating an example process for determining social interaction options for social connections in a social networking environment, according to one embodiment.

DETAILED DESCRIPTION

Figure 1:
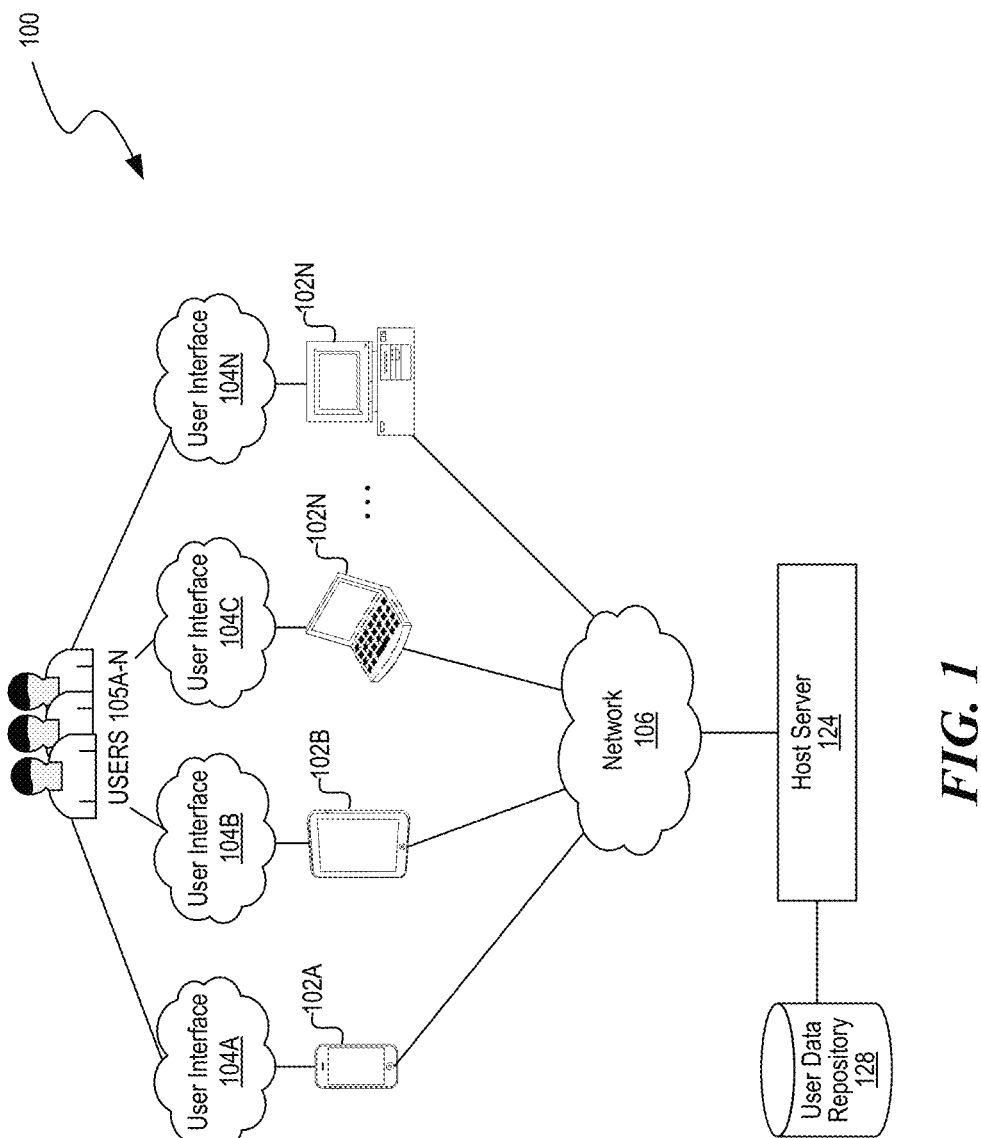
FIG. 1 illustrates a block diagram of client devices or user devices able to communicate with the host server for determining and managing social interaction options for social connections in a social networking environment, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for determining and managing social interaction options for social connections such as, for example, friendships in a social networking environment. In one embodiment, users of a social network are provided with more granularity in controlling the social interactions associated with individual social connections. Each social connection can be a connection between two of more users of a social networking environment.

FIG. 1 illustrates a block diagram of client devices or user devices 102A-N able to communicate with the host server 124 for determining and managing social interaction options associated with social connections in a social networking environment 100, according to one embodiment.

The plurality of client devices or user devices 102A-N can be any system and/or device, and/or any combination of devices/systems that is able to establish a connection with another device, a server and/or other systems. The client devices or user devices 102A-N typically include display or other output functionalities to present data exchanged between the devices to a user. For example, the client devices can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, client devices or user devices 102A-N are coupled to a network 106. In some embodiments, the devices 102A-N may be directly connected to one another.

The network 106, over which client devices or user devices 102A-N and the host server 124 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc. The network 106 can be any collection of distinct networks operating wholly or partially in conjunction to provide connectivity to the client devices or user devices 102A-N and host server 124 and may appear as one or more networks to the serviced systems and devices. In one embodiment, communications to and from client devices or user devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The user data repository 128 can store software, descriptive data, images, system information, drivers, and/or any other data item utilized by other components of the host server 124 and/or any other servers for operation. The user data repository 128 may be coupled to the host server 124. The user data repository 128 may be managed by a database management system (DBMS), for example but not limited to, Oracle, DB2, Microsoft Access, Microsoft SQL Server, PostgreSQL, MySQL, FileMaker, etc. The user data repository 128 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 124 is able to provide data to be stored in the user data (or data item) repository 128 and/or can retrieve data stored in the user data repository 128. The user data repository 128 can store static user data and dynamic user data. The static user data can include user information of the users in the online social network. For example, static user data can include descriptive data of current and past personal information such as, but not limited to, a first name and last name of the user, a valid email ID, a unique user name, age, marital status, occupations, locations lived and worked, education, home town, schools attended, number of siblings, heritage, ethnicity, race, etc. The user information further includes interest information, which may include, but is not limited to, activities, hobbies, professional information, photos, etc.

In one embodiment, the user data stored in user data repository 128 is explicitly specified by the user. For example, when the user (e.g., visitor/service subscriber) signs up for services such as social networking related services, a set of information may be required, such as a valid email address, an address of service, a valid credit card number, social security number, a username, and/or age. The user information form can include optional entries, by way of example but not limitation, location, activity, hobbies, ethnicity, photos, etc. Examples of user data stored in the user data repository 128, including, but is not limited to, user name, user occupation/position, user address, subscription information, hardware ID, hardware model, software version ID, etc. The user data may be entered by a user via a profile. In some cases, each user data may include additional information about whether the user information is public and/or private. For example, the information may include privacy information indicating what, if anything, other users of the social network can view with respect to the user data.

The user data repository 128 can also store dynamic user data. Dynamic user data can either be explicitly submitted by the user or provided via one or more software agents and/or hardware modules such as the host server 124 coupled to the user data repository 128. Dynamic user data can be any action or communication initiated by a user of the social network. For example, a user can periodically update his/her user profile which can be stored in the user data repository 128. Similarly, user preferences can be automatically identified and stored in the repository.

In some embodiments, dynamic information or activities such as user interactions (social interactions), relationships with other users (social connections), user connections, social records, social history records, and/or any communication records can be recorded and stored in the user data repository 128. In one example, the dynamic information can include social connection information and the social interactions that are associated (e.g., available or enabled) with respect to that social connection. For example, when a new social connection request (e.g., friend request) is received from a first user at the host server, the host server may determine, identify, and/or generate a first set of possible social interaction options for the new social connection. The host server can then send the social interaction options to a second user (i.e., the user with which the first user wants to become a social connection or friend) that can accept the social connection request and select one or more of the social interaction options to customize social interactions with the first user.

The dynamic user data essentially tracks the electronic actions that a user performs within the social networking environment. Examples of other dynamic information include, but are not limited to, indications that a user would like to meet another user, indications that a user liked something, indications that a virtual gift was sent or received, indications that a wink was sent or received, and/or indications that a user tagged another user or was tagged by another user. Any electronic action that a user can take within the social network comprises dynamic user data. The user data repository 128 is shown as a discrete component in the example of FIG. 1; however, in some embodiments, the user data repository 128 may be included in the host server 124. Alternatively or additionally, in some embodiments, the user data repository and/or the host server 124 may be both physically and/or functionally distributed.

In one embodiment, the host server 124 is configured to determine and manage social interaction options for social connections in a social networking environment 100. The host server 124 determines, manages, stores, and enforces the social interaction options with respect to the users of the social network. Examples of social interaction options are shown and discussed in greater detail with respect to FIG. 4A-C, FIG. 6, and FIG. 7.

Figure 2:
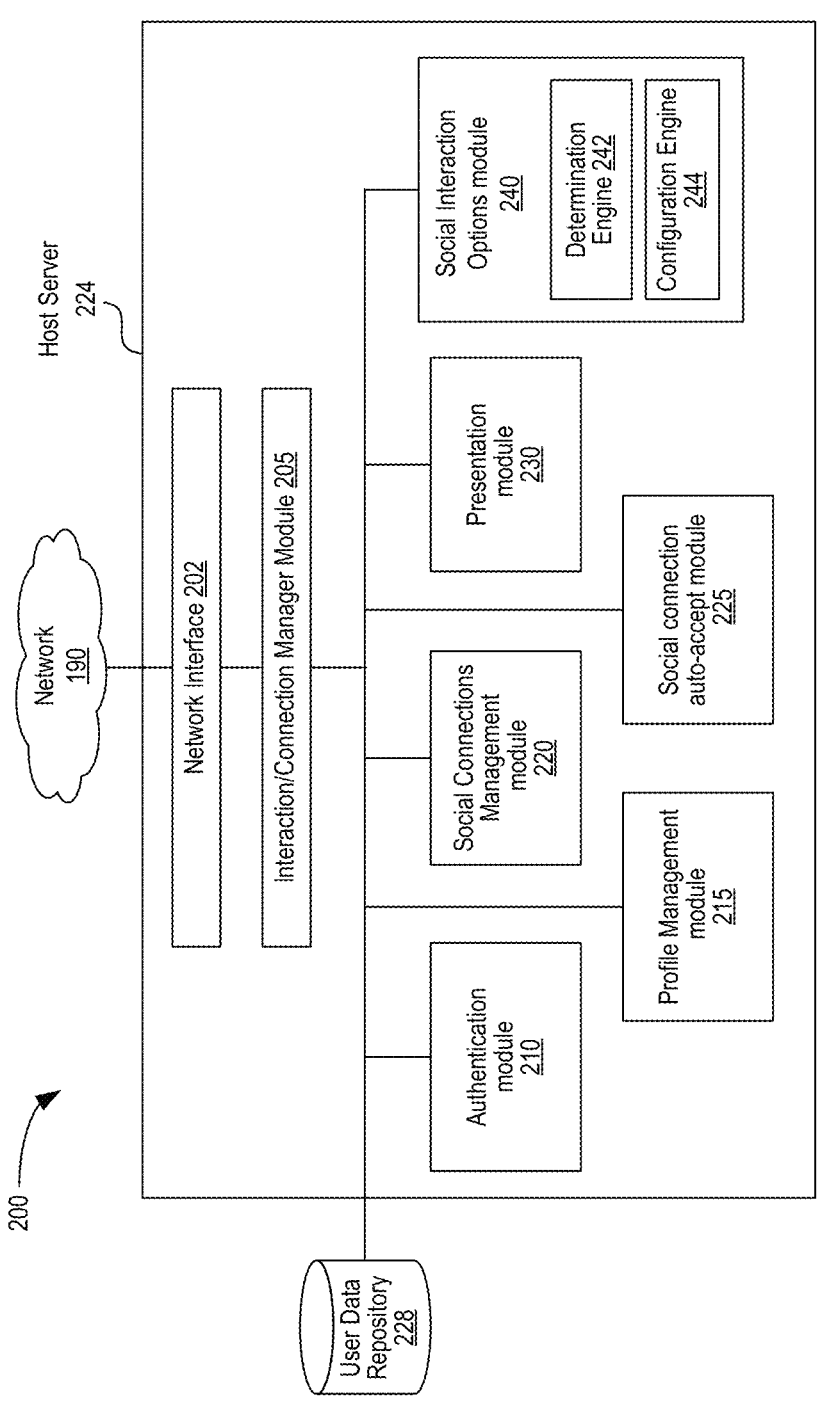
FIG. 2 depicts a block diagram of the components of a host server that determine and manage social interaction options for social connections in a social networking environment, according to one embodiment.

FIG. 2 depicts a block diagram of the components of a host server 224 that determine and mange social interaction options for social connections in a social networking environment, according to one embodiment.

The host server 224 includes a network interface 202, an interaction/connection manager module 205, an authentication module 210, a profile management module 215, a social connections management module 220, a connections auto-accept module 225, a presentation module 230, and a social interaction options module 240. In one embodiment, the host server 224 is coupled to a user data repository 228. The user data repository 228 can be the user data repository 128 of FIG. 1, although alternative configurations are possible. The user data repository 128 is described in greater detail with reference to the example of FIG. 1. Additional or fewer modules can be included without deviating from the novel art of this disclosure. In addition, each module in the example of FIG. 2 can include any number and/or combination of sub-modules and/or systems, implemented with any combination of hardware and/or software.

The host server 224, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 2, the network interface 202 can be a networking device that enables the host server 224 to mediate data in a network with an entity that is external to the host server, through any known and/or convenient communications protocol supported by the host and the external entity. The network interface 202 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

One embodiment of the host server 224 includes the interaction/connection manager module 205. The interaction/connection manager module 205 can be any combination of software agents and/or hardware modules able to identify, detect, track, manage, record, and/or process an occurrence of an interaction, an action, a relationship, an existing connection, and/or a requested connection. The interaction/connection manager module 205, when in operation, is able to communicate with the network interface 202 to identify and detect and/or receive data items including, but not limited to, a set of social interactions or social connections that occurred among multiple users in an online social network. In general, the social interactions that occurred in the online social network are initiated by users using client devices or user devices (e.g., a cell phone, a telephone, a SmartPhone, a PDA, an iPhone, a Blackberry, a computer, a laptop, and/or a Palmtop, etc.). Any type of connections or interactions can be detected and subsequently tracked and/or received and/or recorded for further processing and analysis. The types of connections/social connections can include relationships of various types (e.g., friendship, collegial, family, romantic, gaming, etc.) or relationships/connections of unspecified types. A connection in an online social network generally refers to users who have requested and accepted a connection request and are thus mutually connected.

The interactions/actions that occur in an online social network can include by way of example, but not limitation, sending or receiving an invitation to establish a social connection in the social network, sending or receiving a message, viewing a profile, posting a comment, posting information, joining a group, sending or receiving an invitation to an event or party, belonging to a group, creating a group, etc. The interaction/connection manager module 205 records these actions and determines the sender and recipient of these actions. If the action pertains to a group, the interaction/connection manager module 205 also determines and stores the associated group.

In one embodiment, the social interactions detected by the interaction/connection manager module 205 also includes sending a notification of interest, receiving a notification of interest, and/or responding to a notification of interest. For example, a notification of interest may be sent to a relevant user identified for a particular user when the particular user has indicated interest. The relevant user may respond to the notification if also interested in the particular user. Note that the notifications of interest sent to the particular user may be anonymous or non-anonymous. More specific examples of notifications of interest can include, but are not limited to, indications that a user would like to meet another user, indications that a virtual gift was sent or accepted, indications that a wink was sent or accepted, and/or indications that a user tagged another user. These interactions (also referred to as actions herein) are also tracked by the interaction/connection manager module 205.

One embodiment of the host server 224 includes the authentication module 210. The authentication module 210 can be any combination of software agents and/or hardware components able to manage and register users of host server 224. For example, the authentication module 210 is configured to register new users with the system and/or create new accounts with the host server 224. During registration the user can provide, among other things, login credentials. The authentication module 210 is configured to authenticate the users as they access the host server 224 from a variety of devices. In some embodiments, authentication occurs by associating a user's username and password with an existing user account. Unauthorized users can be directed to register with the system.

One embodiment of the host server 224 includes the profile management module 215. The profile management module 215 can be any combination of software agents and/or hardware components able to control and manage modifications to user profiles. For example, a user can periodically update his/her user profile which can be stored in the user data repository 228. The user profile can include a variety of personal information describing the user. Some of this information can be public information that other users can view and some of the information can be private. Likewise some information in a users profile may be viewable by some users but not by other users. For example, social connections or friends of the user may be able to view the user's profile while non-social connections are not able to view the user's profile.

One embodiment of the host server 224 includes the social connections management module 220. The social connections management module 220 can be any combination of software agents and/or hardware components able to access, manage, and/or enforce social interaction options with respect to individual social connections in the social networking environment. In one embodiment, the social connections management module 220 receives input regarding the enabled social interactions from one or more of the users associated with a social connection and/or the user data repository 228. The social connections management module can verify, associate, and/or store this information in the user data repository 228. Alternatively or additionally, in some cases, one or both of the users associated with a social connection can adjust, modify, add, and/or delete specified enabled or disabled social interaction options in order to adjust the social interactions that are enabled with respect to an existing social connection.

In one embodiment, the social connections management module 220 can access the social connections and the associated social interaction options from the user data repository 228 in order to determine which social interactions are enabled for a given social connection. For example, a first user may attempt to communicate with a social connection (e.g., a second user) or perform an action with respect to the second user and the host server 224, through use of the social connections management module 220, can determine whether or not the action is enabled.

One embodiment of the host server 224 includes the social connection auto-accept module 225. The social connection auto-accept module 225 can be any combination of software agents and/or hardware components able to automatically accept social connection requests on behalf users of a social networking environment. For example, a primary user of the social networking environment can configure the auto-accept module 225 to automatically accept requests on behalf of the primary user.

In one embodiment, the auto-accept module 225 automatically accepts requests to join other user's social networks on behalf of the primary user under specific conditions. For example, the auto-accept module 225 may automatically accept a request from a secondary user on behalf of a primary user if the request includes limited social interaction options. That is, the primary user may configure the auto-accept module 225 to accept social contact requests that limit social interaction options to, for example, gaming purposes only. Accordingly, if a second user sends the primary user a social connection request specifying that the second user wants to interact with the primary user only during gaming, then the auto-accept module 225 can automatically accept that social connection request without getting a confirmation from the primary user. It is appreciated, that the primary and/or the secondary user can later request to increase or otherwise modify the social interaction options. In this case, one or both of the users may have to confirm the increased level of social interaction (e.g., enabling of additional social interaction options for the specified social connection).

One embodiment of the host server 224 includes a presentation module 230. The presentation module 230 can be any combination of software agents and/or hardware modules able to present information to users of the social networking environment. In one embodiment, the presentation module 230 is coupled the social connections management module 220, the social connection auto-accept module 225, and the social interaction options module 240. When in operation, the presentation module 230 presents notifications and information to an associated client device for electronic presentation to a user. The user device may be, for example, a computer, laptop, cell phone, Blackberry, iPhone, etc. The presented information can include images, and/or textual information, etc.

One embodiment of the host server 224 includes the social interaction options module 240. The social interaction options module 240 can be any combination of software agents and/or hardware components able to determine, identify, and/or generate a set of possible social interaction options for a new social connection. The social interaction options module 240, when in operation, is able to communicate with the social connections management module 220 and/or the user data repository 228 to access and/or store social interaction options information. In one embodiment, the social interaction options module 240 includes a determination engine 242 and a configuration engine 244.

In one embodiment, the social interaction options module 240 includes the determination engine 242. The determination engine 242 can be configured to determine a first set of social interaction options for a social connection based on one or more pre-set social configuration settings. In one example, the host server uses the determination engine 242 to perform the determination in response to receiving a request identifying a social connection. As discussed above, each social interaction option enables or disables a social interaction associated with the social connection.

In one embodiment, the social interaction options module 240 includes the configuration engine 244. The configuration engine 244 can be configured to identify and/or determine the (available) pre-set social configuration settings that a user can select (enable) with respect to a social connection. When determining the available social configuration options, the host server may use configuration setting from one or more users associated with the social connection. That is, the social configuration settings can be the settings configured by the user that initiates a social connection request or the user to which the social connection request is directed.

In one embodiment, the pre-set social configuration settings can be configured by a user to configure status levels or tiers. For example, a user of the social network can configure one or more status levels or tiers for each social connection. In this example, each social level or tier includes one or more social interaction options allowing the users of a social connection that is classified under that social level or tier to perform the social interactions associated with the social interaction options included in that tier or level. In one example, each user may have a plurality of status levels or tiers by default. These status levels or tiers may be customizable and/or configurable by each user of the social network.

FIG. 3 depicts a flow diagram illustrating an example process 300 for determining social interaction options for social connections in a social networking environment, such as, for example the web-based social networking environment 100 of FIG. 1, according to one embodiment. A host server such as, for example, host server 124 of FIG. 1 can, among other things, determine the social interaction options for social connections in a social networking environment.

In process 302, the host server receives a request identifying a social connection between a first user and a second user of a plurality of users of a social network. In one embodiment, the request can comprise a new social connection request initiated by a first user. In this case, the new social connection request can indicate the requested social connection (e.g., a friend request initiated by the first user for delivery to the second user).

The request can also comprise a request from either the first user or the second user to modify, edit, delete, or upgrade an existing social connection. For example, if the first user and the second user are already friends in the social network, then either user can increase or decrease the social interaction options that are enabled with respect to the social connection (e.g., the friendship between the first user and the second user). It is appreciated that limiting or decreasing the social connection options may not require confirmation from the other user. However, in some cases, increasing the social interaction options associated with a social connection may require an acknowledgment or confirmation from both users.

In process 304, the host server processes the request to identify the first user and the second user. As discussed, the request may comprise a new friend request. In this case, the host server can identify the user initiating the request (i.e., the first user) and the person to which the request is directed (i.e., the second user). However, if the social connection already exits then the request may be initiated by either the first user or the second user. In this case, the request may identify the social connection and the host system can determine or otherwise identify which users are associated with the social connection based on information stored in the system.

In process 306, the host server determines a first set of social interaction options for the social connection based on one or more pre-set social configuration settings. In this process, each social interaction option enables or disables a social interaction associated with the social connection. Examples of social interactions include, but are not limited to, instant messaging, SMS, picture viewing/commenting, games, viewing/contacting social contacts, meetme request viewing/messaging, video viewing/commenting, etc. It is appreciated that other social interactions are also possible and that each social interaction can be further broken down granularly and enabled or disabled by users. In some embodiments, users can configure new social interactions and/or group social interactions into tiers or levels. In some cases, the tiers or levels illustrate a level of friendship or status. The tiers or levels of friendship and/or status are discussed in greater detail with respect to FIG. 7.

In process 308, the host server sends the first set of social interaction options to a second client device for electronic presentation to the second user. In process 310, the host server receives a response from the second user indicating which social interaction options, if any, the second user has selected for the social connection with the first user. Examples of the social interaction options that can be presented to a user are shown and discussed in greater detail with respect to FIG. 6 and FIG. 7.

Figure 4A:
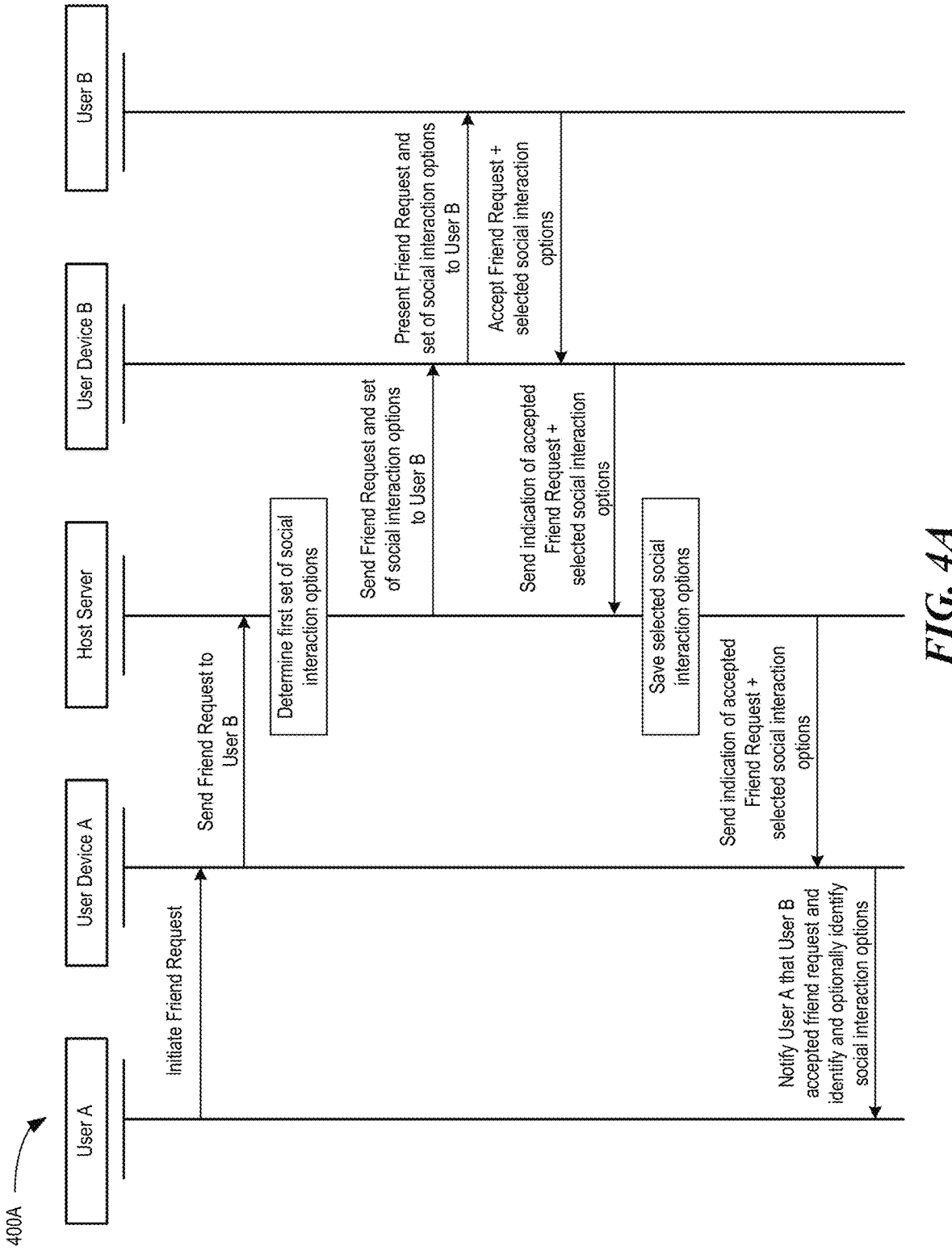
FIGS. 4A-4C depict sequence diagrams illustrating example operations of components of a social networking environment for determining social interaction options for a new social connection, according to one embodiment.
Figure 4B:
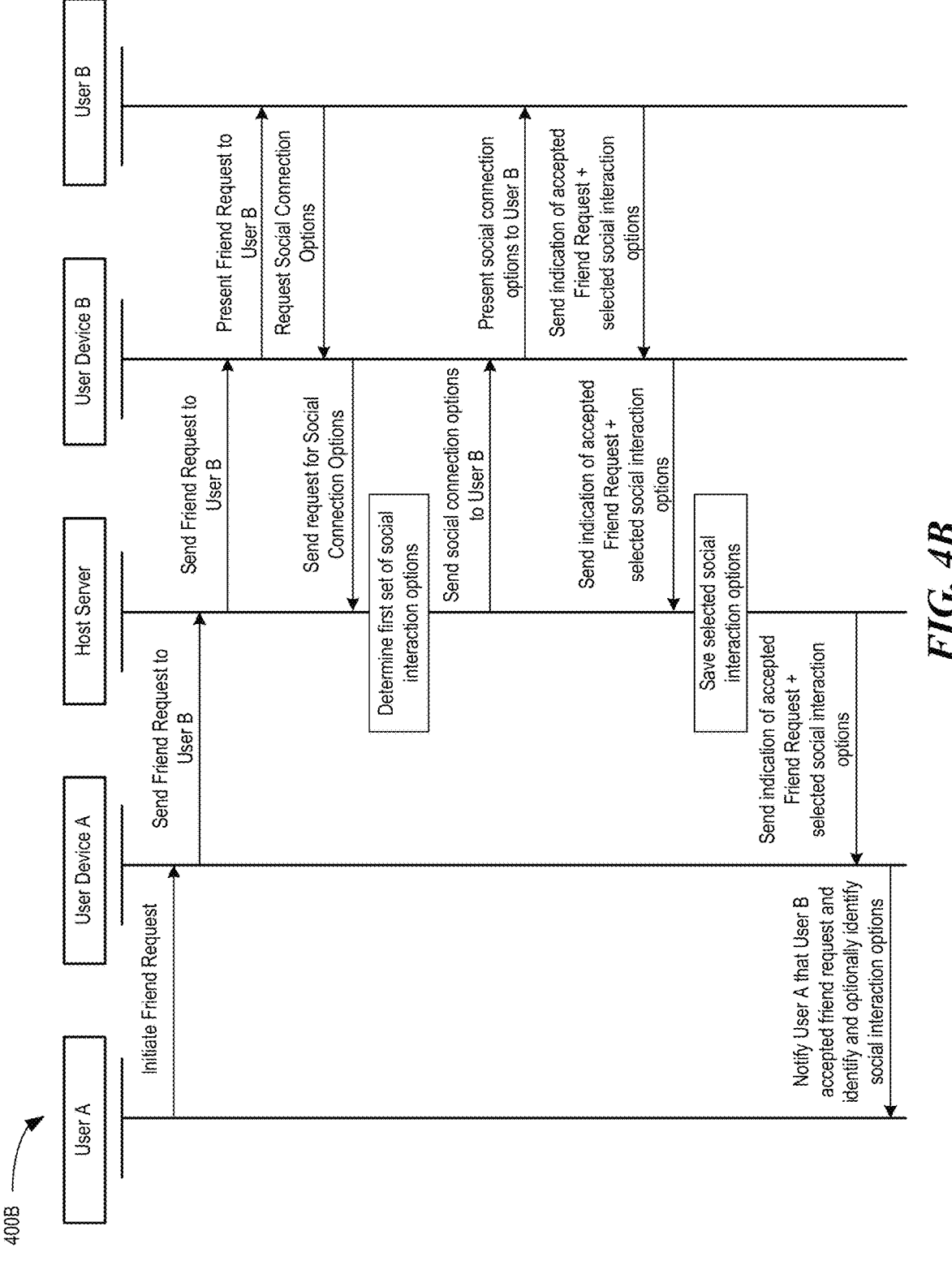
Figure 4C:
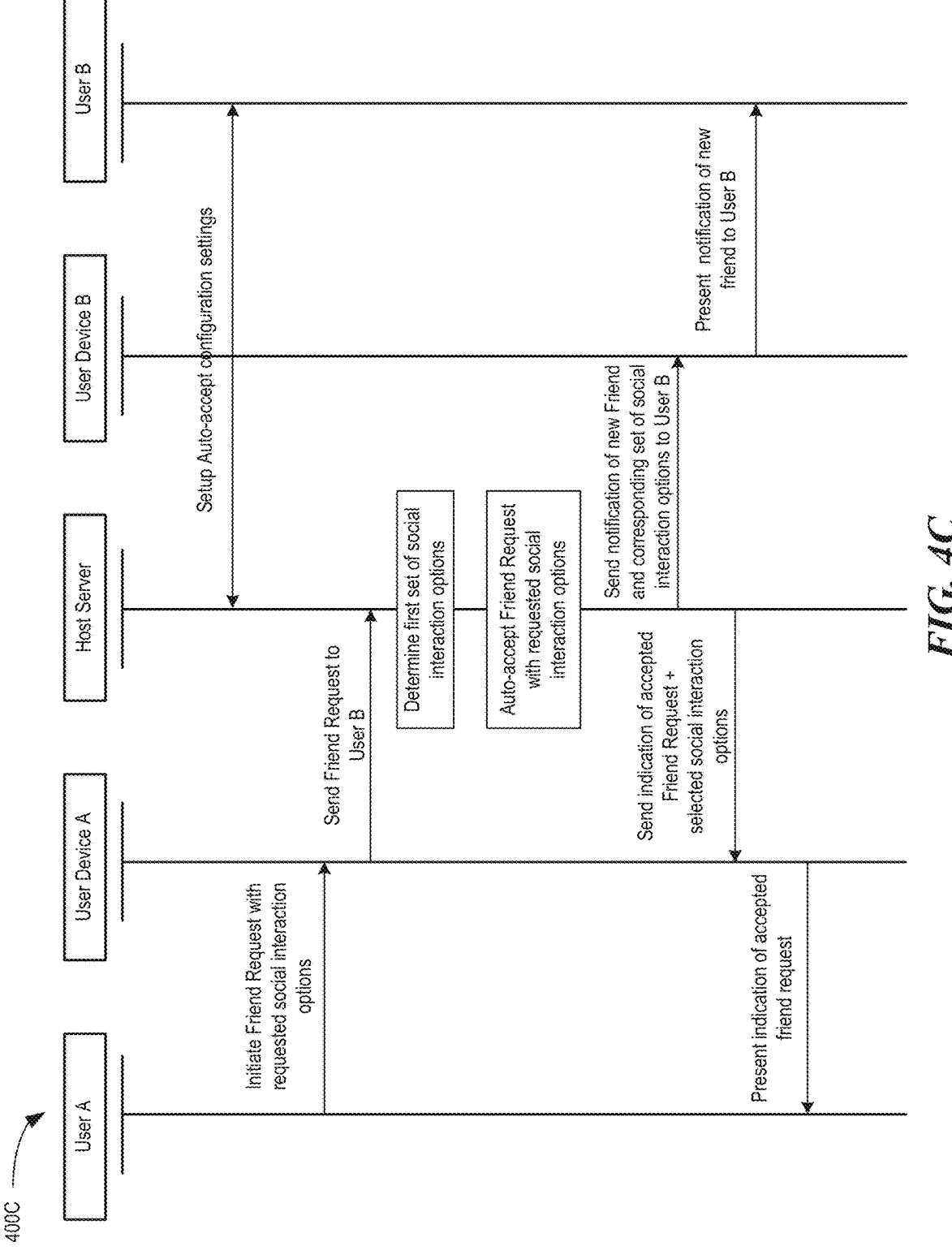

FIGS. 4A-4C depict sequence diagrams 400A-C illustrating example operations of components of a social networking environment for determining enabled social interaction options for a social connection, according to one embodiment. More specifically, sequence diagrams 400A-C illustrate several examples of handling new friend requests (new social connection requests) in a social networking environment. As discussed above, a host server can determine interaction options for a social connection in response to receiving a new social connection request and/or a request to edit/modify an existing social connection. As shown, the social connection requests include a first user A and a second user B; however, it is appreciated that more users may be included in a single social connection in some embodiments (e.g., social group connections).

Referring first to FIG. 4A, which depicts a sequence diagram 400A illustrating an example of determining a set of enabled social interaction options for a new social connection, according to embodiment. To begin, a user can pre-configure one or more configuration settings in the host server. It is appreciated that, in some embodiments, default configuration settings may be applied.

Initially, a first user A initiates a friendship or social connection request via a first user device A. The friend request indicates that the first user A intends or wishes to become friends with a second user B. The first user device A transmits the friend request to the host server. Upon receiving the friend request from user B, the host server determines the first set of social interaction options available to the (potential) social connection.

The available social interaction options can be determined based on default configuration settings of the first user A and/or the second user B. For example, user A may have pre-configured a configuration setting such that all new connection requests are sent with a specific friendship tier or level (e.g., gold friendship status requested) and/or with specific social interaction options requested. Alternatively or additionally, the friend request itself can include additional information about the requested social interaction options and/or the requested level, tier, or status of friendship that is requested. In one embodiment, the first user A can request the levels or tiers of friendship that have been previously customized by the second user B prior to initiating the friendship or social connection request. In this way, the first user A can send a request to the second user B based on the customized tiers that the second user A has previously developed.

In the example of FIG. 4A, the host server sends the friend request and the available social connection options to the second user device. The second user device presents the social connection options to the second user. The second user can then select the social interaction options, if any, that the second user wants to enable (or be associated with) the social connection with the first user. Although not shown, the second user can deny and/or ignore the friend request. In this example, the second user device subsequently sends the selected interaction options and an indication of the accepted friend request to the host server.

The host server saves and/or otherwise stores the enabled (or selected) social interaction options and sends an indication of the accepted friend request to the user device A. The host server may also send an indication of the enabled (or selected) social interaction options so that the first user is aware of the available social options for the social connection. The first device A electronically presents this information to the first user A. In one embodiment, this information may be presented to the first user A responsive to a request from the first user A.

FIG. 4B depicts a sequence diagram 400B illustrating an example of determining a set of enabled social interactions for a new social connection request responsive to a user request, according to an embodiment. Sequence diagram 400B is similar to sequence diagram 400A, however, in the example of FIG. 4B, the first set of social interaction options are determined responsive to a request from the second user.

FIG. 4C depicts a sequence diagram 400C illustrating an example of determining a set of enabled social interactions for a new social connection request and automatically accepting the request, according to an embodiment. To begin, the second user B sets up one or more automatic accept configuration settings with the host server. The automatic accept configuration settings may direct the host server to automatically accept social connection requests that include only certain (limited) social interaction options and/or specific social connection requests including specific tiers or levels of friendship. It is appreciated that a user could automatically accept all requests, but for the purposes of discussion, and this example, it is assumed that the second user B wants to limit which social connections that are automatically accepted. Further, in some embodiments, default automatic accept configuration settings can be applied.

Continuing with the example of FIG. 4C, once the automatic accept configuration settings are set, the first user A can initiate a friendship or social connection request via a first user device A. The friend request indicates that the first user A intends or wishes to become friends with a second user B. In this example, the friend request also includes requested social interaction options. Alternatively or additionally, the friend request can include a requested level or tier of friendship. The level or tier indicates a friendship status and can identify the one or more social interaction options that are associated with that friendship level or tier to the host server.

The first user device A transmits the friend request to the host server. Upon receiving the friend request from user B, the host server determines the first set of social interaction options available to the (potential) social connection. The available social interaction options can be determined based on default configuration settings of the first user A and/or the second user B. Alternatively or additionally, the friend request can include information about the requested social interaction options and/or a requested level, tier, or status of friendship that is requested. In one embodiment, the first user A can request the levels or tiers of friendship that have been previously customized by the second user prior to initiating the friendship or social connection request.

The host server identifies the requested social interaction options and compares the requested social interaction options with the pre-set configuration settings to determine whether or not the new social connection request can be automatically accepted. In one embodiment, the pre-set configuration settings indicate that the host server can automatically accept any request with specified social interaction options. In this example, the host server automatically accepts the friend request with the requested social interaction options because the requested social interaction options are specified in the pre-set configuration settings. The host server subsequently notifies the user device B that of the new friendship or connection and user device A that the friend request was accepted. The user devices can present this information to the respective users immediately, upon request, or at a later time.

Figure 5:
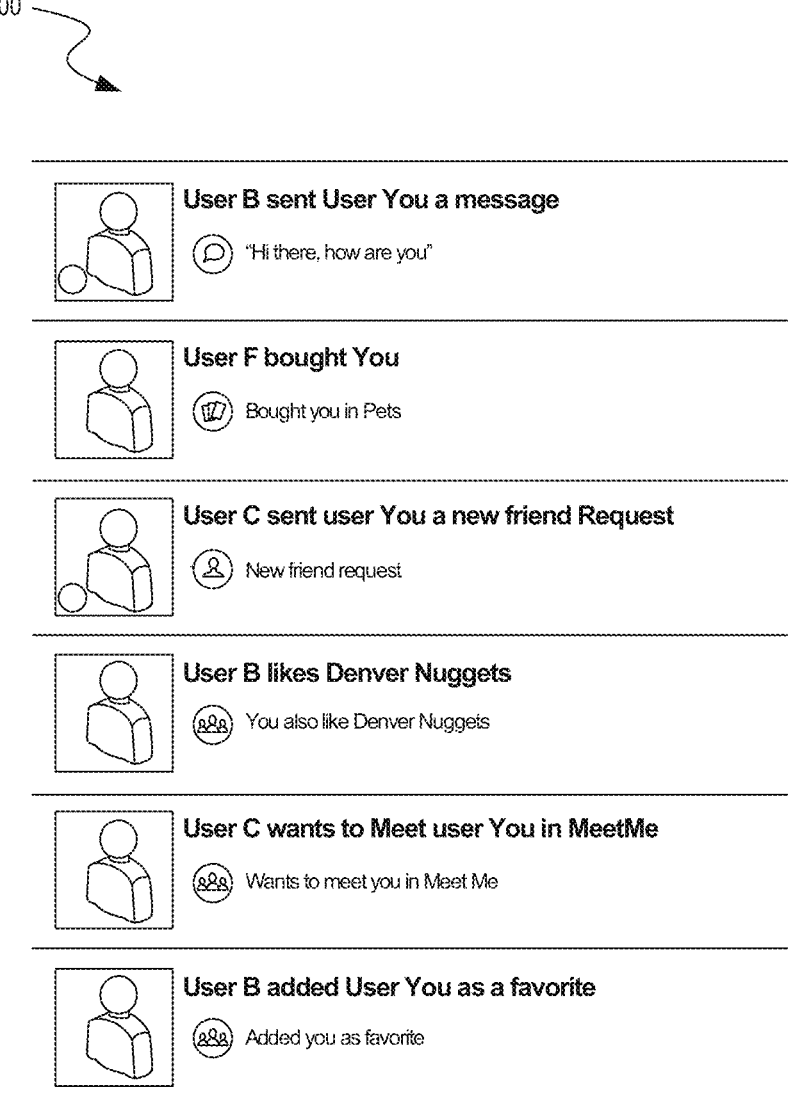
FIG. 5 illustrates an example social feed, according to an embodiment.
Figure 6:
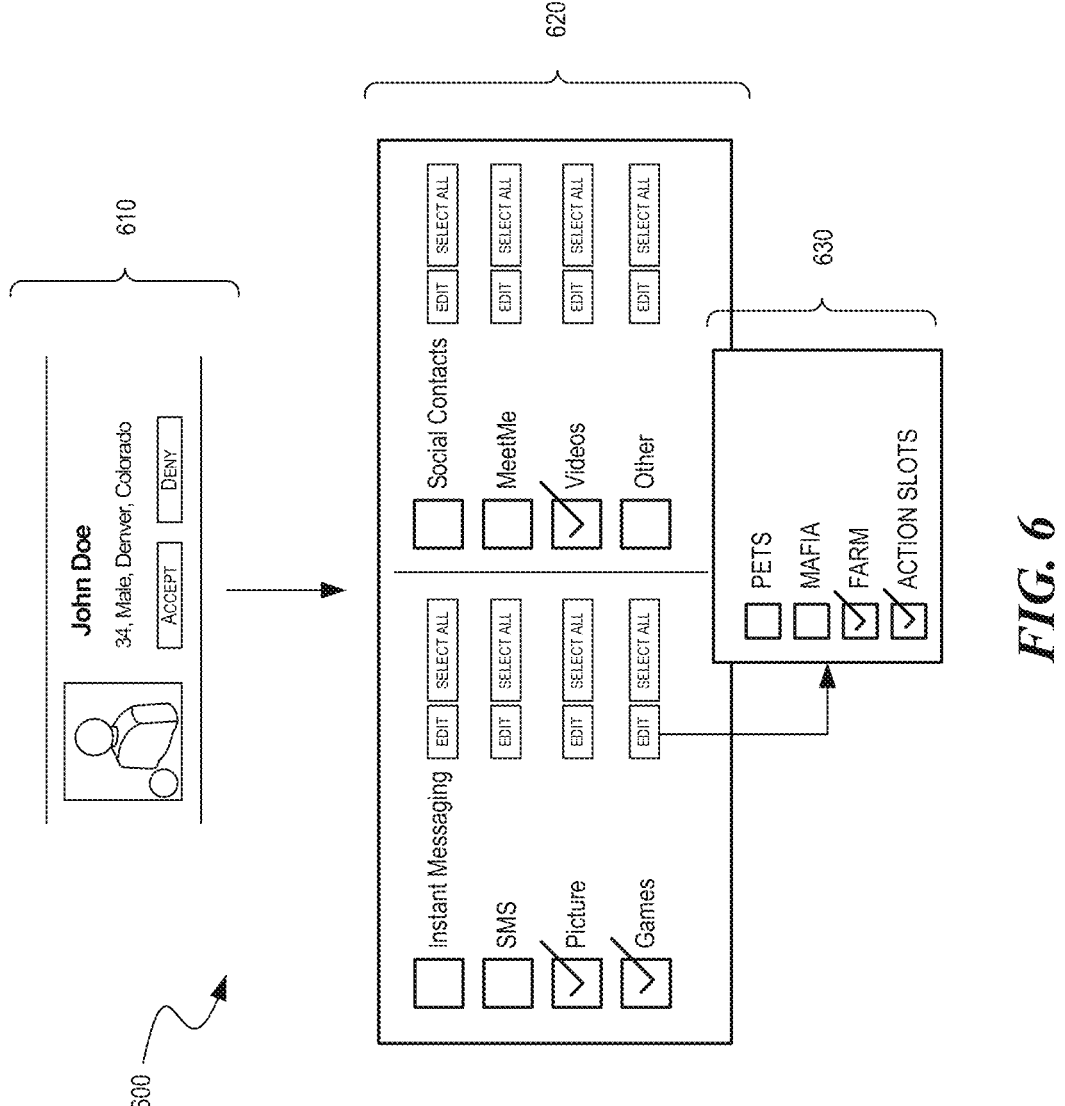
FIG. 6 illustrates an example user interfaces showing social interaction options pages, according to one embodiment.
Figure 7:
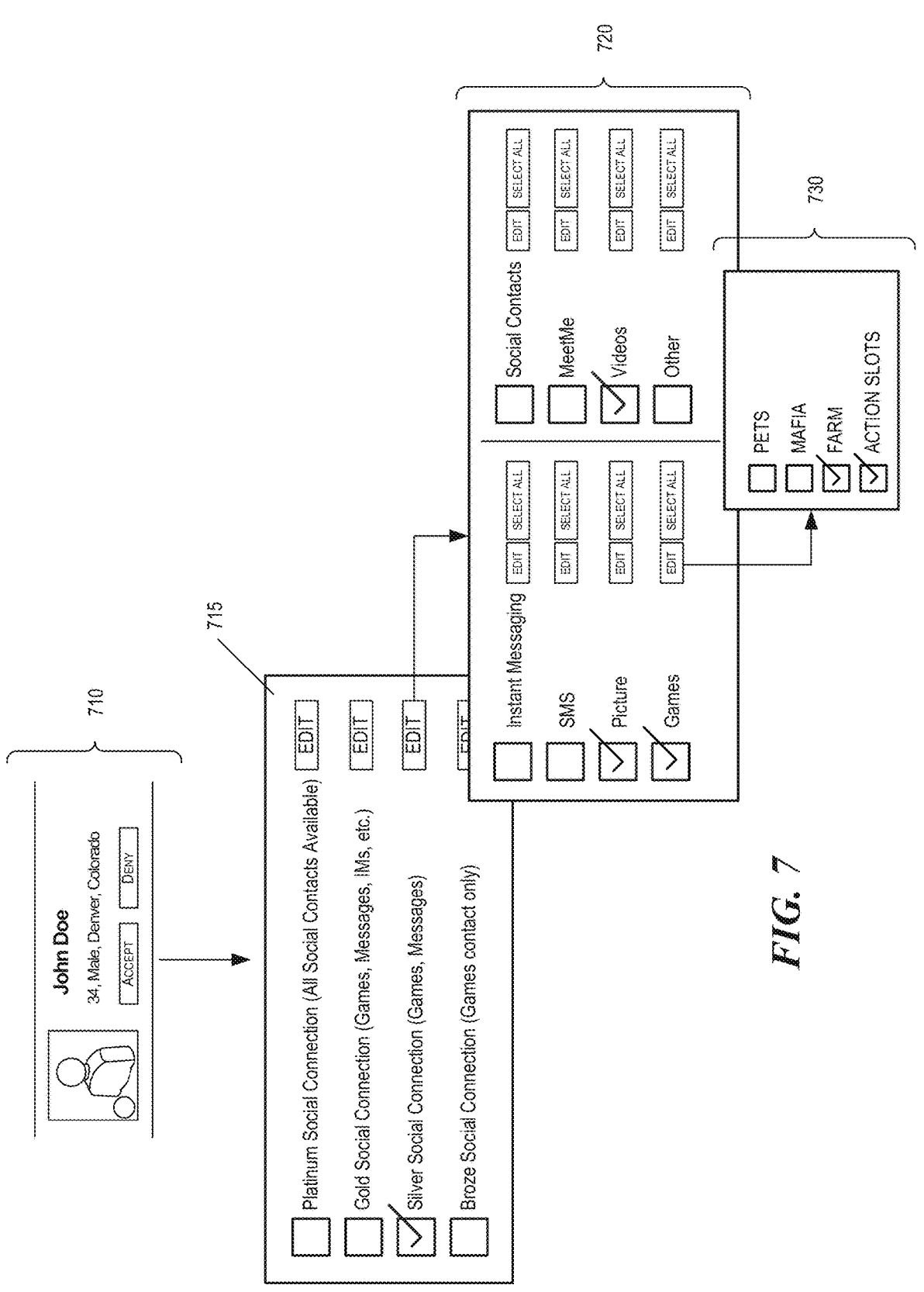
FIG. 7 illustrates an example user interfaces showing social interaction options pages, according to one embodiment.

FIG. 5 depicts an example social feed 500 illustrating a series of recent and/or current events that are related and displayed or otherwise presented to a first user, according to an embodiment. More specifically, the social feed 500 depicts a plurality of entries illustrating actions, events, communications, etc. that other users have taken that are related or associated with the first user. Of particular interest, in one entry of the social feed 500, user C has sent the first user a new friend request. FIG. 6 and FIG. 7 illustrate examples of how the host server may present the new friend request to the first user and how the first user can respond to this new friend request including selecting one or more social interaction options for the social connection between user C and the first user.

FIG. 6 depicts an example 600 illustrating user interfaces (or panes) 610, 620, and 630, according to one embodiment. The example 600 includes an entry 610 in a social feed for a first user. In this example, the entry 610 comprises a friend request from "John Doe." The first user can accept or deny the friend request by selecting the "Accept" or the "Deny" buttons. It is appreciated that the buttons and the remaining selections discussed herein can be selected by the user via use of a touch screen device, by the user via a mouse or other external device, and/or by the user via any other known methods.

In example 600, the first user accepts the friend request and is subsequently presented with a first social interaction options page 620. The first social interaction options page 620 includes a plurality of social interaction options that a user can select via check boxes. In this example, each entry in the first social interaction options page 620 includes an "EDIT" button and a "SELECT ALL" button. It is appreciated that other buttons may also be present such as, for example, a "SELECT NONE" button. Further, in some cases, it is appreciated that some or all of the entries may not have any associated buttons. In some embodiments, the request from "John Doe" may include a set of requested social interaction options. A social interaction option that is not requested may not be selectable by the first user. That is, the option may not be displayed to the first user or the option may be displayed but the checkbox cannot be activated or selected.

By selecting the edit button, the first user can view and make selections on a more granular level. In this example, the first user has selected the "Games" entry and the edit button to provide a list of games to select. Selecting the "EDIT" button on the "Games" entry of the first social interaction options page 620 causes the second social interaction options page 630 to be displayed to the first user. The first user can then select the games that the first user wants enabled with respect to the connection with "John Doe." Although not shown, upon completion, the selections can be confirmed by the user device and sent to the host server saving, enforcement, and notification.

FIG. 7 depicts an example 700 illustrating user interfaces 710, 715, 720, and 730, according to one embodiment. Example 700 is similar to example 600 of FIG. 6, however, in example 700 a tiered list 715 is presented to the first user. The tiered list 715 may be configured by the first user prior to receiving the request from the second user (i.e., "John Doe"), by the second user prior to sending the request, or by the second user as part of (i.e., included with) the request.

In example 700, the tiered list 715 includes four tiers (e.g., Platinum, Gold, Silver, and Bronze); however, it is appreciated that more or fewer tiers can be used. Moreover, in some embodiments, user can add, delete, and or modify the tiers including the social interaction options that are associated by a tier. This information can be stored by the host server. In this example, the silver tier social status is previously configured by the first user and selected by "John Doe" as the requested level or status of friendship. However, the first user may want to further view or customize (e.g., add, edit, or otherwise modify) the social interaction options with respect to the social connection with "John Doe." Accordingly, the user can select or client the "EDIT" button associated with the "Silver Social Connection" entry and then select or de-select the social interaction options that the first user would like to be enabled with the social connection with "John Doe." It is appreciated that the resulting social connection is a modified version of the silver social connection template. The modified version is specific to the social connection with "John Doe." In some embodiments, the host server may prompt the user to save the selected changes to the template for application to future requests.

Figure 8:
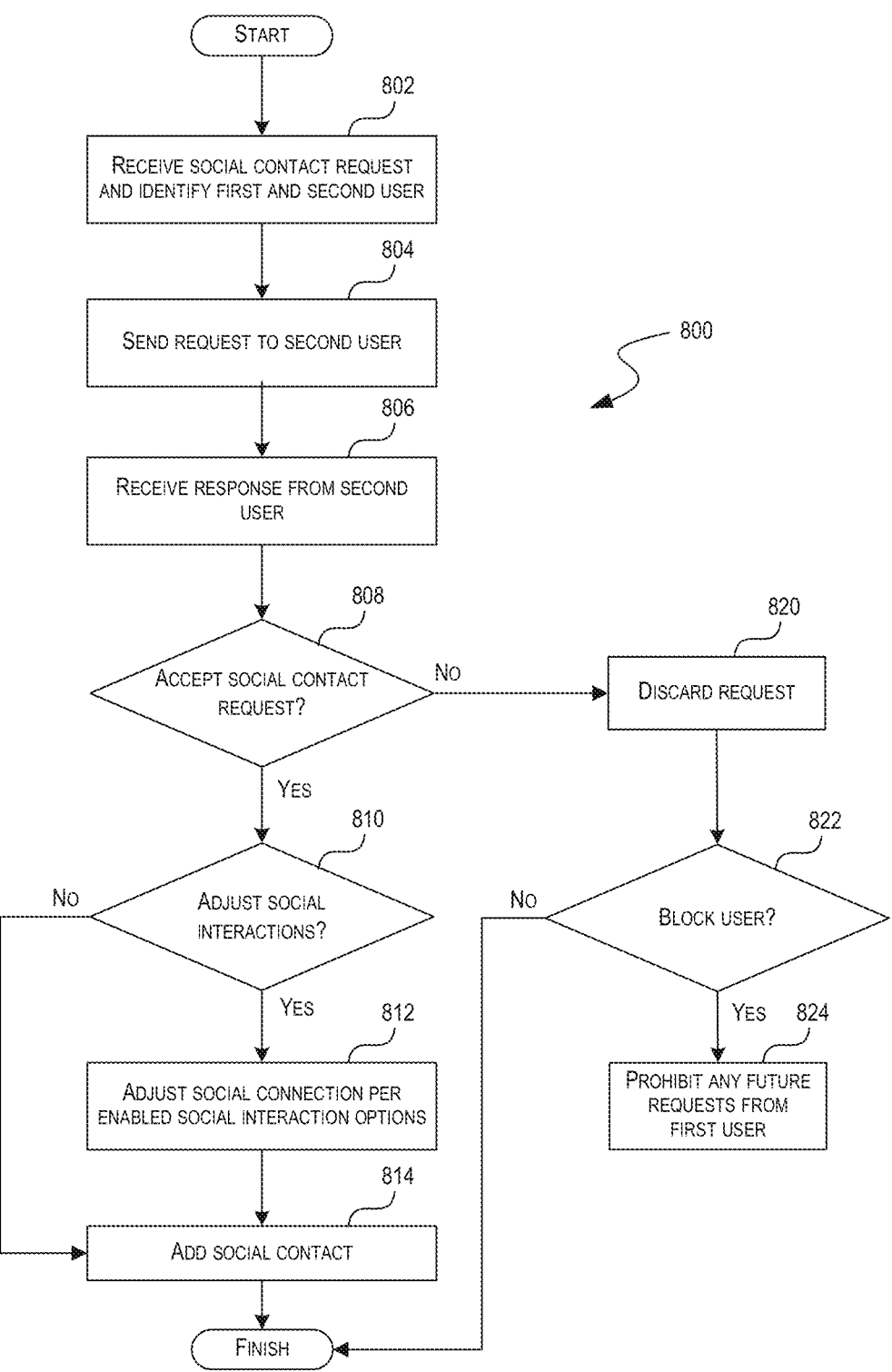
FIG. 8 depicts a flow diagram illustrating an example process for determining social interaction options for social connections in a social networking environment, according to one embodiment.

FIG. 8 depicts a flow diagram illustrating an example process 800 for determining and managing social interaction options for social connections in a social networking environment, such as, for example the web-based social networking environment 100 of FIG. 1, according to one embodiment. A host server such as, for example, host server 124 of FIG. 1 can, among other things, determine and manage the social interaction options for social connections in a social networking environment.

In process 802, the host server receives a social contact request and identifies first and second users associated with the contact request. As discussed above, the social contact request can be, for example, a friend request send from the first user to the second user, although other requests are possible.

In process 804, the host server sends the request to the second user. As discussed above, the second user can accept and/or deny the social contact request. Additionally, in some instances, the second user can select one or more social interaction options to be associated with the new social connection should the second user decide to accept the social contact request. In process 806, the host server receives the response from the second user which includes an indication of whether the second user accepted or denied the social contact request. Additionally, the response can include selected social interaction options, if any.

In process 808, the host server determines whether the second user accepted the social contact request. If not, in process 820, the host server discards the request. Optionally, in process 822, the host server may inquire as to whether the second user would like to block the first user from future contact. If so, in process 824, the host server prohibits future requests and/or communications, etc. from the first user directed to the second user. Otherwise, the host server finishes the transaction.

If the second user accepted the contact request from the first user, then in process 810, the host server determines whether it needs to adjust (associate) specific social interactions with the new social connection between the first user and the second user. In process 812, the host server adjusts the social connection as per the selected or enabled social interaction options. Lastly, in process 814, the host server adds and/or saves the social connection or social contact. The host server may store this information in a user data repository such as, for example, the user data repository 128 of FIG. 1.

Figure 9:
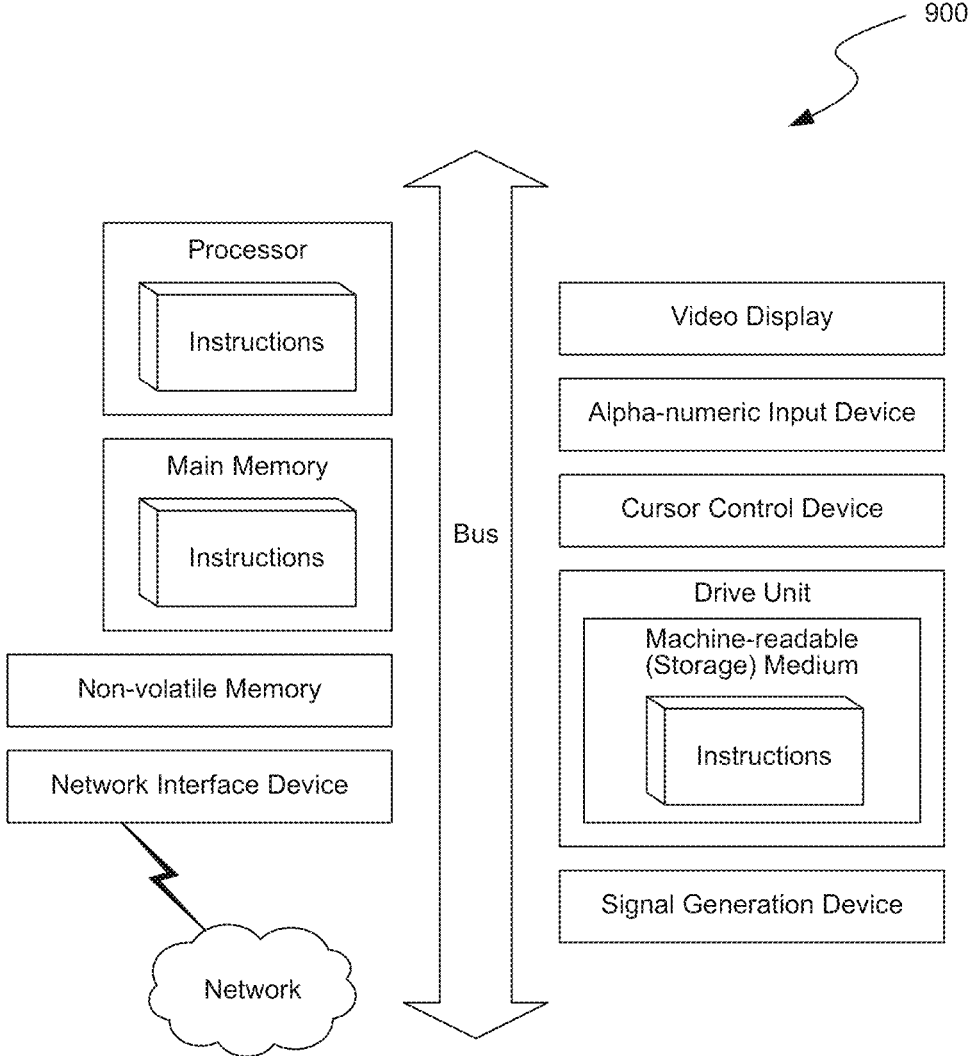
FIG. 9 shows a diagrammatic representation of a machine in the example form of a computer system within which a set of instructions, for causing the machine to perform any one or more of the methodologies discussed herein, may be executed, according to one embodiment.

FIG. 9 shows a diagrammatic representation of a machine in the example form of a computer system 900 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The invention claimed is:

1. A method of setting user settings during establishment of a new internet-based social connection request on a social network comprising:

receiving an indication, via a graphic user interface, that both (i) accepts a new social connection request and (ii) sets a permission setting that enables or disables the ability to send game invites of a selection of games from a predetermined list of games, wherein an inviter associated with the new social connection request provides the new social connection request to an invitee;

the inviter provides the permission setting and the predetermined list of games to the invitee when providing the new social connection request; and the invitee is enabled to toggle the permission setting to control the ability of the inviter to send subsequent game invites to the invitee from the selection of games toggled by the invitee; and indicating to the inviter whether game playing invites are enabled with the invitee, wherein the indication is provided via the graphic user interface.

2. The method of claim 1, wherein the graphic user interface includes a set of pre-set social configuration settings that are configured to be modified as part of the new social connection request in a multi-level menu.

3. The method of claim 1, further comprising:

transmitting the indication to a social network server; and facilitating, by the social network, the game playing invites between the invitee and the inviter.

4. The method of claim 1, wherein said receiving the indication occurs automatically on behalf of the inviter based on configuration settings to do so by pre-set social configuration settings.

5. The method of claim 1, further comprising:

sending, by the social network, a status level option with the new social connection request to the invitee for electronic presentation; and said receiving the indication further a response from the invitee indicating which status level, if any, the invitee has selected for the new connection with the inviter.

6. The method of claim 1, wherein the indication by the invitee includes a selection that the invitee would like to block all social interactions with the inviter.

7. The method of claim 1, wherein the permission setting is customizable by the invitee within the new social connection request.

8. A method of setting user settings during establishment of a new internet-based social connection request on a social network comprising:

receiving an indication, via a graphic user interface, that both (i) accepts a new social connection request and (ii) sets a permission setting that enables or disables the ability to send invites to video chatting of a selection of video chatting settings from a predetermined list of video chatting settings, whereinan inviter associated with the new social connection request provides the new social connection request to an invitee;

the inviter provides the permission setting and the predetermined list of video chatting settings to the invitee when providing the new social connection request; and the invitee is enabled to toggle the permission setting to control the ability of the inviter to send subsequent game video chatting invites to the invitee from the selection of video chatting settings toggled by the invitee; and indicating to the inviter whether video chatting invites are enabled with the invitee, wherein the indication is provided via the graphic user interface.

9. The method of claim 8, wherein the graphic user interface includes a set of pre-set social configuration settings that are configured to be modified as part of the new social connection request in a multi-level menu.

10. The method of claim 8, further comprising:

transmitting the indication to a social network server; and facilitating, by the social network, the video chatting invites between the invitee and the inviter.

11. The method of claim 8, wherein said receiving the indication occurs automatically on behalf of the inviter based on configuration settings to do so by pre-set social configuration settings.

12. The method of claim 8, further comprising:

sending, by the social network, a status level option with the new social connection request to the invitee for electronic presentation; and said receiving the indication further a response from the invitee indicating which status level, if any, the invitee has selected for the new connection with the inviter.

13. The method of claim 8, wherein the indication by the invitee includes a selection that the invitee would like to block all social interactions with the inviter.

14. The method of claim 8, wherein the permission setting is customizable by the invitee within the social connection request.

15. A system of setting user settings during establishment of a new internet-based social connection request on a social network comprising:

a processing unit;

an interface configured to communicate with an invitee via a first client device and an inviter via a second client device; and a memory unit including instructions stored thereon that, when executed by the processing unit, cause the processing unit to:

receive an indication, via a graphic user interface, that both (i) accepts a new social connection request and (ii) sets a permission setting that enables or disables the ability to send invites to video chatting of a selection of video chatting settings from a predetermined list of video chatting settings, wherein the inviter provides the new social connection request to the invitee;

the inviter provides the permission setting and the predetermined list of video chatting settings to the invitee when providing the new social connection request; and the invitee is enabled to toggle the permission setting to control the ability of the inviter to send subsequent game video chatting invites to the invitee from the selection of video chatting settings toggled by the invitee; and indicate to the inviter whether video chatting invites are enabled with the invitee, wherein the indication is provided via the graphic user interface.

16. The system of claim 15, wherein the interface includes a set of pre-set social configuration settings that are configured to be modified as part of the new social connection request in a multi-level menu.

17. The system of claim 15, wherein the instructions further include:

transmit the indication to a social network server; and facilitate, by the social network, the video chatting invites between the invitee and the inviter.

18. The system of claim 15, wherein said receiving the indication occurs automatically on behalf of the inviter based on configuration settings to do so by pre-set social configuration settings.

19. The system of claim 15, wherein the instructions further include:

send, by the social network, a status level option with the new social connection request to the invitee for electronic presentation; and said receiving the indication further includes a response from the invitee indicating which status level, if any, the invitee has selected for the new connection with the inviter.

20. The system of claim 15, wherein the indication by the invitee includes a selection that the invitee would like to block all social interactions with the inviter.

* * * * *